US007930414B2

(12) United States Patent
Choudhury

(10) Patent No.: US 7,930,414 B2
(45) Date of Patent: Apr. 19, 2011

(54) SYSTEM AND METHOD FOR COMMUNICATING WITH TOOLS IN A CLOSED, SECURE PRODUCTION NETWORK

(75) Inventor: Ziyad A. Choudhury, Hopewell Junction, NY (US)

(73) Assignee: International Business Machines Corporation, Srmonk, NY (US)

( * ) Notice: Subject to any disclaimer, the term of this patent is extended or adjusted under 35 U.S.C. 154(b) by 578 days.

(21) Appl. No.: 11/970,724

(22) Filed: Jan. 8, 2008

(65) Prior Publication Data
US 2009/0177789 A1 Jul. 9, 2009

(51) Int. Cl.
*G06F 15/16* (2006.01)
(52) U.S. Cl. .................... 709/229; 709/227
(58) Field of Classification Search ............ 709/229, 709/200–203, 217–227; 726/2, 4, 11, 26
See application file for complete search history.

(56) References Cited

U.S. PATENT DOCUMENTS

| 6,772,034 | B1 * | 8/2004 | Shi et al. .................... 700/121 |
| 6,792,463 | B1 | 9/2004 | Lamberton et al. |
| 6,996,841 | B2 | 2/2006 | Kadyk et al. |
| 2002/0198964 | A1 * | 12/2002 | Fukazawa et al. ............ 709/219 |
| 2003/0220768 | A1 * | 11/2003 | Perry et al. .................... 702/188 |
| 2004/0255161 | A1 * | 12/2004 | Cavanaugh ................... 713/201 |
| 2006/0143244 | A1 * | 6/2006 | Chia ............................ 707/204 |

* cited by examiner

*Primary Examiner* — Moustafa M Meky
(74) *Attorney, Agent, or Firm* — Ian MacKinnon; Roberts Mlotkowski Safran & Cole, P.C.

(57) ABSTRACT

A system and method for providing connectivity to a closed, secure production network, and computer program products for executing the same and, more particularly, to a system and method for securely communicating with remote tools. The system comprises a self-configuring server configured to create separate, isolated networks for a vendor specific toolset and query a client for connection information such that the self-configuring server can engage an identified vendor specific toolset on one of the separate isolated networks by mimicking the connection information of the client.

24 Claims, 4 Drawing Sheets

SYSTEM AND METHOD FOR COMMUNICATING WITH TOOLS IN A CLOSED, SECURE PRODUCTION NETWORK

FIELD OF THE INVENTION

The invention generally relates to a system and method for providing connectivity to a closed, secure production network, and computer program products for executing the same and, more particularly, to a system and method for securely communicating with remote tools.

BACKGROUND OF THE INVENTION

Automated IC fabrication facilities (Fabs), such as a facility for processing 300 mm wafers, may include many different types of tools for the fabrication of semiconductor devices. These tools typically include proprietary information specific to certain vendors. For this reason, access to each of the tools is provided on their own secure local server. That is, each tool is accessible through its own server to ensure that the vendor data stays proprietary. In this way, it is not possible to gain access to tools through another vendor's server.

In such automated facilities, the basic goals are generally the same: to operate the overall facility with very high degree of efficiency, quality and flexibility, in order to maximize productivity and return-on-investment. Often times, this in turn requires optimizing product mix and output, while minimizing downtime. However, minimizing downtime in an active production system environment can be challenging, especially since data for each tool can be only accessed locally on its own server. For example, a vendor authorized user must be physically present at the tool facility to access the tool and its data. Thus, maintenance, repair, etc. on the tool can consume valuable production time.

In addition, new and updated applications used in facilitating the manufacturing processes in a fabrication facility oftentimes interfere with production during installation and testing. For example, MES tools (e.g., IBM's® SiView products) utilize databases to store real time data and communicate information to automated systems in the facility. When updating/testing MES and supporting applications (e.g., Murata's® Automated Material Handling System), access to real time data and supporting applications need to be enabled on a live network. However, when these test systems access the MES and interact with production activities, there may be adverse effects on the daily manufacturing quota (e.g., degradation of the availability commitment of the MES).

Accordingly, there exists a need in the art to overcome the deficiencies and limitations described hereinabove.

SUMMARY OF THE INVENTION

In a first aspect of the invention, a system comprises a self-configuring server configured to create separate, isolated networks for a vendor specific toolset and query a client for connection information such that the self-configuring server can engage an identified vendor specific toolset on one of the separate isolated networks by mimicking the connection information of the client.

In yet another aspect of the invention, a computer program product creates network subnets in a production facility for private, non-advertised tools. The computer program product includes instructions for causing a computer to implement a method, comprising: creating isolated subnets based on vendor specific tool(s) in a private non-advertised network; obtaining authentication, unique protocols and ports, and location information from a client to engage with a specific tool or group of tools residing on one of the isolating subnets; and providing communications between the client and the specific tool or group of tools in one of the isolated subnets based on at least the unique protocols and ports and the specific tool or group of tools.

In another aspect of the invention, a method comprises creating isolated network subnets for each tool or toolsets associated with a vendor in a production network. The method further comprises querying a client for unique protocols and ports, and location information of a tool or toolsets to access on the isolated network subnets and, upon receiving, accessing the tool or toolsets associated with the location information. The method further includes conveying data from the accessed tool or toolsets to the client.

DETAILED DESCRIPTION OF THE INVENTION

Figure 1:
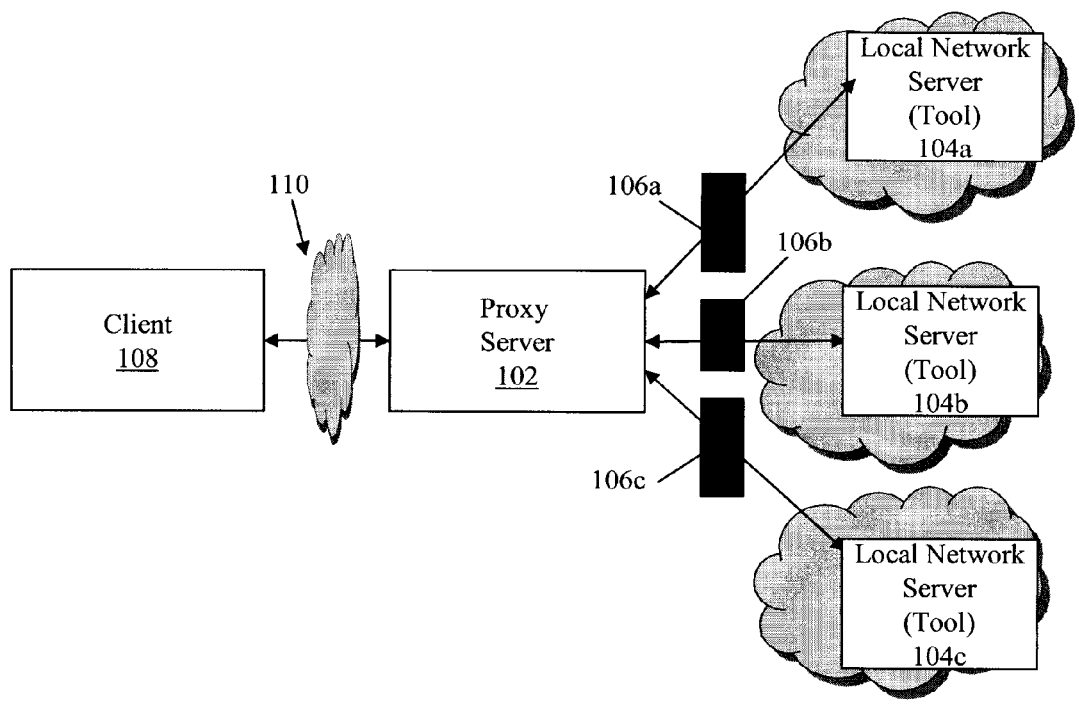
FIG. 1 shows an illustrative environment for implementing the processes in accordance with the invention.

The invention generally relates to a system and method for providing connectivity to a closed, secure production network, and computer program products for executing the same and, more particularly, to a system and method for securely communicating with remote tools (also referred to as toolsets). More particularly, the invention relates to a system and method for isolating vendor specific tools on their own network subnet or segment, e.g., isolated network, and protecting each of the isolated tools by a firewall. The isolated network for each of the tools provides a secure network, preventing malicious attacks and access by unauthorized personnel to proprietary data. As such, in embodiments, the secure, isolated networks provide connectivity for connecting production systems to the clients in a manufacturing environment such that performance data can be securely extracted for testing and compliance of production system applications and upgrades. Real time production data is accessed without impacting production systems or environments.

More specifically, in embodiments, a proxy server constructs and engages each of the isolated networks via a firewall and, as such is configured to control access to all of the tools in the production facility. The tools on each of the isolated networks and processes thereon may be vendor specific and proprietary to the vendors. Additionally, the proxy server is self-configuring as it is enabled with all TCP/IP protocols and ports. As should be understood by those of skill in the art, in computing, a protocol is a convention or standard that controls or enables the connection, communication, and data transfer between two computing endpoints. Also, a port is a special number present in the header of a data packet. Ports are typically used to map data to a particular process running on a computer.

The proxy server is also capable of gaining access to any specific tool by authenticating the client and finding the client specific protocol and port to engage the tool. The proxy server finds the protocol and port information by performing a protocol level sweep with the client. Once the proxy server finds the client protocol and port information, it can then "mimic"

the client when accessing the specific tool on the secure, isolated network. The proxy can then provide the information to the client.

In this configuration, the proxy server, aware of the secure, isolated networks and protocols and ports for client access to such tools on the networks, can communicate natively with the tools, making the client and the tools communicate as if they are next to each other, while the client and the tools (and even the proxy server) are actually remotely located from one another. In this manner, the client can remotely access each authorized, isolated network environment associated with a tool or toolset, in a secure manner.

In embodiments, the system and method of the invention is configured to interface with many different types of tools, including Agilent™ Parametric testers, MOSAID™ testers, and PDF™ Process characterization yield learning systems for configuration parameters and recipe management of systems that do not interface with SiView™. SiView™ is a manufacturing execution system that IBM has integrated with its fabrication processes. SiView leverages information from DB2 to automatically control each step of the fabrication process in the 300 mm wafer fabrication process. IBM WebSphere® MQ provides the messaging platform that enables DB2 to exchange information with the production tools and other application programs used to run the fabrication processes.

System Environment

FIG. 1 shows an exemplary secure isolated network and accompanying environment. The system shown in FIG. 1 may be representative of a manufacturing facility, e.g., semiconductor manufacturing facility for 300 mm wafers.

The system of FIG. 1 includes a proxy server 102 in communication with at least one network subnet or segment 104a, 104b, 104c. The network subnets or segments 104a, 104b, 104c, are each isolated, secure subnets or segments, and each include vendor specific tools or toolsets. The tools or toolsets may include, for example, Agilent™ Parametric testers, MOSAID™ testers, and PDF™ Process characterization yield learning systems. While only three network subnets or segments 104a-104c are generally shown in the system of FIG. 1, it will be understood that the secure production network may provide an infrastructure comprising any number or combination of tools and associated network subnets or segments in a production facility (e.g., engineering test network, vendor tool test network, various application support networks, etc.).

In embodiments, the proxy server 102 is configured to separate and isolate each of the vendor specific tools into the network subnets or segments 104a, 104b, 104c. In this way, communication between different vendor specific tools will be independent from each other (or other combinations as designed by the production facility). Accordingly, in such a configuration a client will not be able to gain access to unauthorized tools or toolsets. Also, as each of the tools are on an isolated network 104a-104c, the system and method of the invention contemplates, in one embodiment, that access to the tools is provided only through each of the isolated networks 104a-104c by the proxy server 102 in the production network. Of course, each tool can also be accessed by its local server (not shown).

To provide additional security, e.g., from malware, the network subnets or segments 104a, 104b, 104c are each protected by an associated firewall 106a, 106b, 106c. More specifically, each of the subnets or segments 104a, 104b, 104c may include a firewall to prevent unauthorized access thereto and enforce any limitations on authorized access. The firewalls may be implemented using conventional hardware and/or software as is known in the art.

In embodiments the firewalls are configured to allow in bound traffic into the tools, but the tools are not enabled to initiate outbound communication. Thus, for example, it is contemplated by the invention that the tools are not allowed to start any communication, and can only respond to a communication from the proxy server (or local server). It is also contemplated by the invention that outside communications are restricted to the proxy server 102. In this way, the tools cannot provide any information or data to unauthorized clients (or hackers) that gain access to an isolated subnet or subgroup. Also, in the case that malware is found, the proxy server 102 is configured to remediate any issues related to the malware, and thereafter continue with the data transfer.

In implementation, a client 108 gains access to the tools via the proxy server 102. As each client 108 may have specific software which has unique protocols and ports, the proxy server 102 queries the client 108 for its protocol and port information, e.g., TCP/IP, FTP, etc., for the tool. By having all known protocols and ports resident on the proxy server, it is possible for the proxy server to use the protocols and ports unique to the client to engage the tool. In this way, the proxy server 102 is a self-configuring proxy server.

Moreover, the proxy server 102 queries the client 108 for the IP address and/or host name and/or directory of the tool (on the network subnet or segment). As only the client knows the correct IP address and/or host name and/or directory of the tool to which it wants access, such mechanism provides additional security and/or safeguards to the system. The proxy server 102 also authenticates the client 108 using, for example, LDAP or some type of directory services. As should be understood by those of skill in the art, the authentication process is used to stop unauthorized personnel from accessing data in which they do not have a right to access.

Once the client protocol, port and IP address (and/or host name and/or directory) is determined, and the client is properly authenticated, the proxy server 102 can gain access to the tool on the secure network subnet or subgroup by connecting to the IP address (initiating a handshake) and "mimicking" the client (e.g., using the client specific protocol and port). As should be understood, the proxy server 102 mimics the client by using the client's protocol and port information. In embodiments, the proxy server 102 also finds and uses the ports of the tools, as discussed in more detail below.

In the case that the proxy server 102 was not able to find the client protocol and/or port information or, alternatively, the proxy server 102 does not have the proper protocol and/or port information resident on its system, the proxy server 102 can still initiate communication with the tools by translating the protocol and/or port information to engage the authorized tool. The translation of protocols and ports can be accomplished in any known manner to those of skill in the art.

The proxy server 102 may be implemented using one or more computer processing devices operating in response to computer programs stored in a storage medium accessible by the proxy server 102. The proxy server 102 may operate as a network server (e.g., a web server) to communicate with the client and the tools. The proxy server 102 is preferably only accessible by the clients and support personnel and production applications (tools). In embodiments, the client 108 has access to the proxy server 102 via a secure intranet 110 which is isolated from the Internet or other external means of communication.

Figure 2:
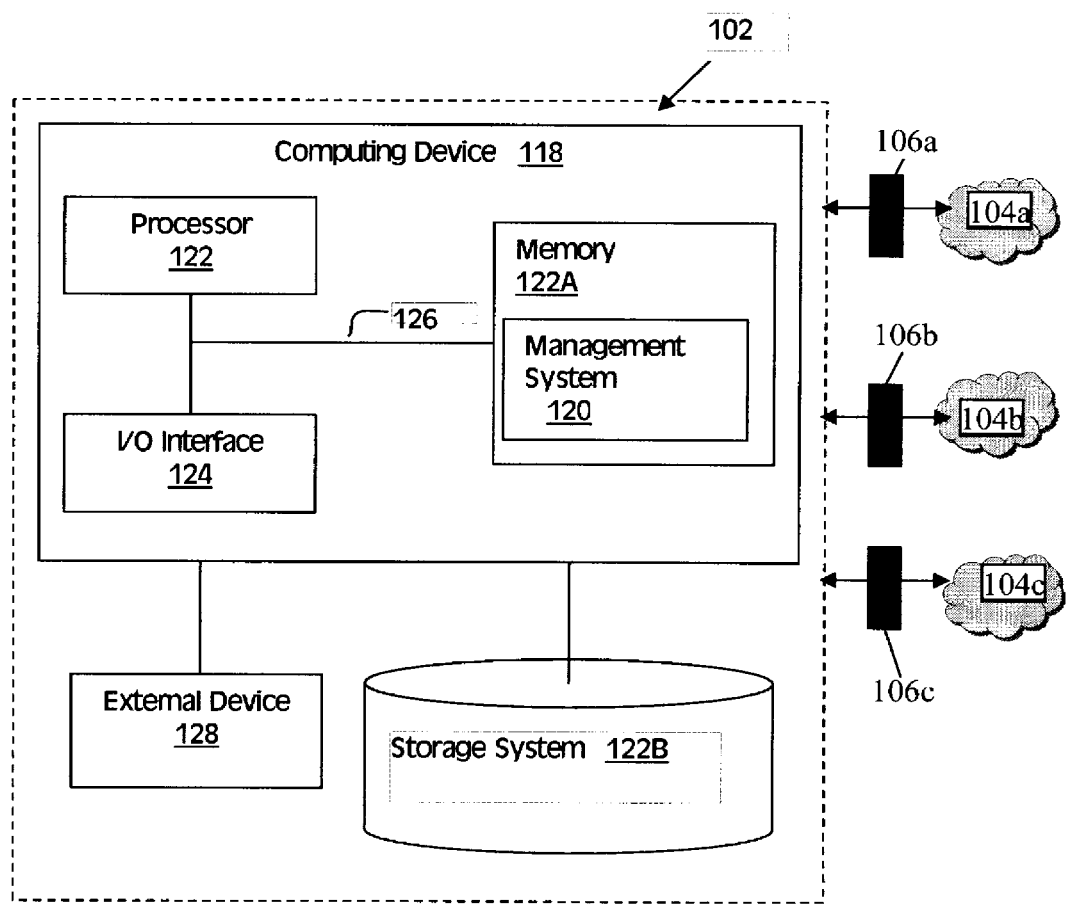
FIG. 2 shows a configuration in accordance with exemplary embodiments of the invention.

FIG. 2 shows a configuration of the proxy server in accordance with exemplary embodiments of the invention. The proxy server 102 executes one or more computer programs to create and provide secure network functions between independent, isolated network subnets or segments. The proxy server 102 includes a computing device 118 that comprises a management system 120. The management system 120 includes program code to allow the proxy server 102 to create the subnets or segments 104a, 104b, 104c, thereby allowing a client access to tools at a remote location.

More specifically, the proxy server 102 functions to establish one or more subnets or segments 104a, 104b, 104c that include and allow access to specified vendor tools. The subnets or segments 104a, 104b, 104c are designed to isolate one or more tools from other tools. By isolating tools, the various tools and processes enable access to real production data while securely maintaining the integrity of data in the production environment. Thus, by implementing the system and method of the invention, it is now possible to securely access the servers for each of the tools at a remote location.

The computing device 118 includes a processor 122, a memory 122A, an input/output (I/O) interface 124, and a bus 126. The memory 122A can include local memory employed during actual execution of program code, bulk storage, and cache memories which provide temporary storage of at least some program code in order to reduce the number of times code must be retrieved from bulk storage during execution. Further, the computing device 118 is in communication with an external I/O device/resource 128 and a storage system 122B. The external I/O device/resource 128 may be keyboards, displays, pointing devices, etc. Thus, the I/O device 128 can comprise any device that enables an individual to interact with the computing device 118 and/or any device that enables the computing device 118 to communicate with one or more other computing devices using any type of communications link.

The processor 122 executes the computer program code, which is stored in memory 122A and/or storage system 122B. The computer program code is configured to execute the processes described herein. While executing the computer program code, the processor 122 can read and/or write data to/from the memory 122A, storage system 122B, and/or I/O interface 124. The bus 126 provides a communications link between each of the components in computing device 118.

The computing device 118 can comprise any general purpose-computing article of manufacture capable of executing the computer program code installed thereon (e.g., server, etc.). For the purposes of this description, the article of manufacture can be a computer-usable or computer readable medium that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

It is understood that the computing device 118 is only representative of various possible equivalent-computing devices that may perform the processes described herein. To this extent, in embodiments, the functionality provided by the computing device 118 can be implemented by a computing article of manufacture that includes any combination of general and/or specific purpose hardware and/or computer program code. In each embodiment, the program code and hardware can be created using standard programming and engineering techniques, respectively.

Further, while performing the processes described herein, one or more computing devices can communicate with one or more other computing devices using any type of communications link. For example, the computing device 118 can communicate with the client, office server, etc. The communications link can comprise any combination of wired and/or wireless links; any combination of one or more types of networks (e.g., the Internet, a wide area network, a local area network, a virtual private network, etc.); and/or utilize any combination of transmission techniques and protocols.

Embodiments of Processes

Figure 3A:
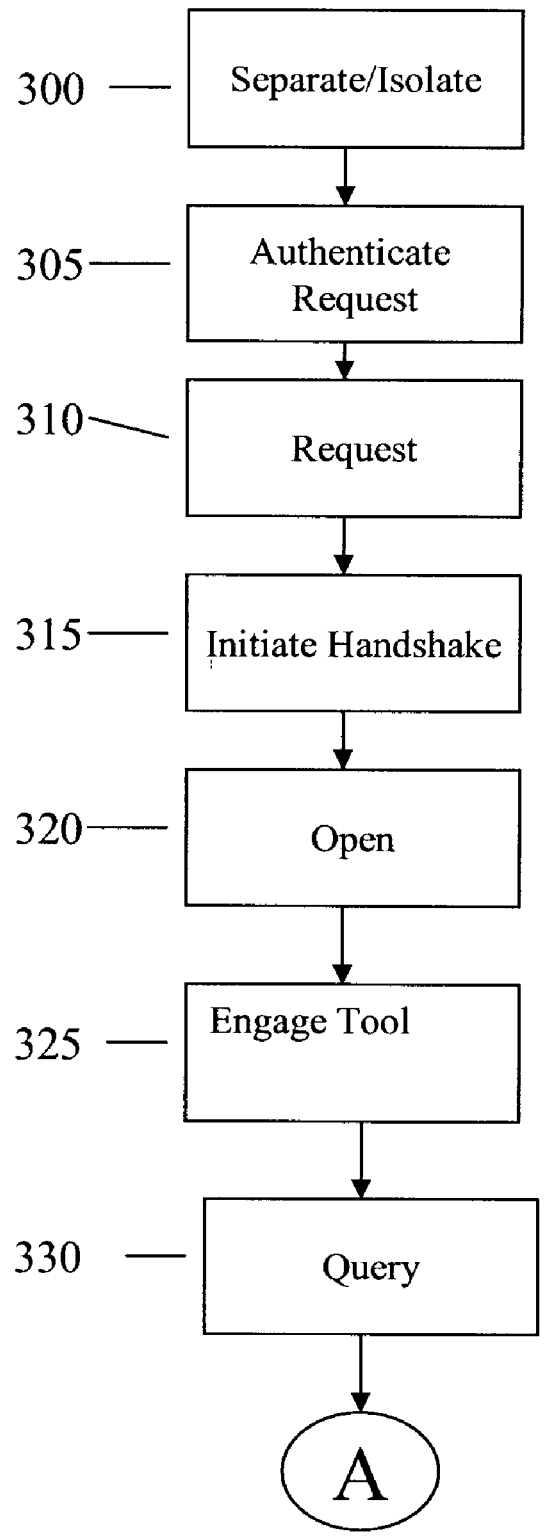
FIGS. 3A and 3B show a flow diagram implementing processes in accordance with the invention.
Figure 3B:
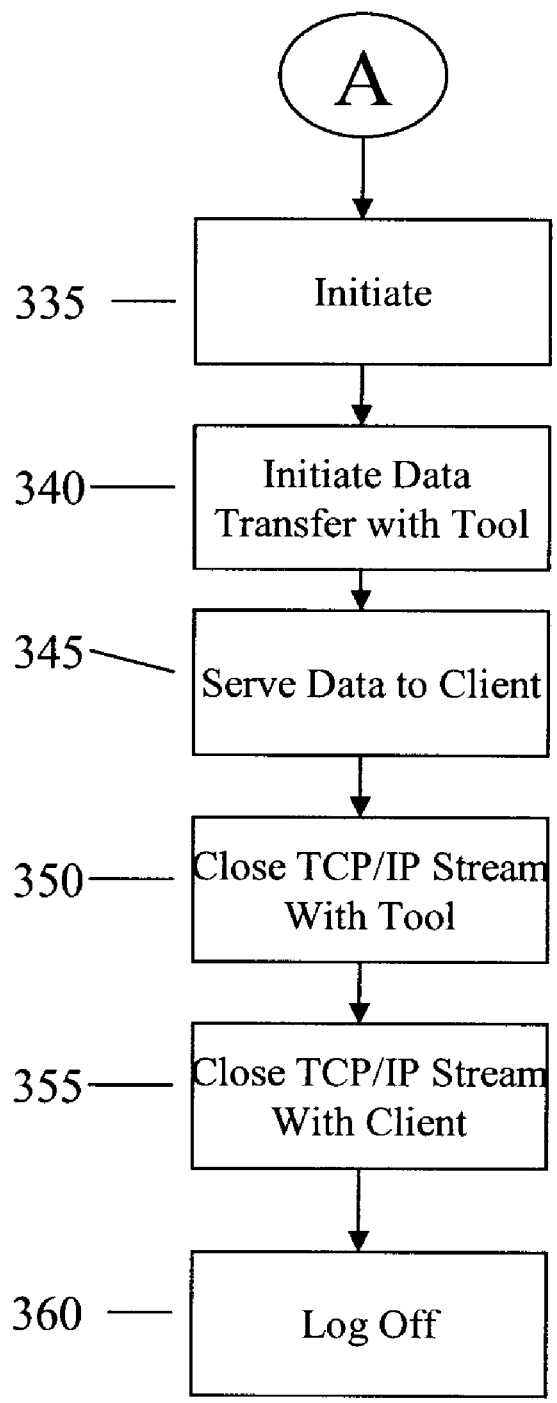

FIGS. 3A and 3B show a flow diagram describing a process for providing secure network communication in accordance with exemplary embodiments of the invention. FIGS. 3A and 3B show may equally represent a high-level block diagram of components of the invention implementing the processes thereof. The processes of FIGS. 3A and 3B show may be implemented on computer program product accessible from a computer-usable or computer-readable medium providing program code for use by or in connection with a computer or any instruction execution system, in combination with the appropriate hardware as discussed with reference to FIG. 2. Additionally, the invention can take the form of an entirely hardware embodiment or an embodiment containing both hardware and software elements (any of which is referred generally as "management system") as discussed herein. The hardware and software elements include a computer infrastructure configured to implement the functionality of the present invention.

At step 300, the proxy server separates and isolates each tool for different vendors into separate network subnets or segments. As discussed herein, the separate network subnets or segments are isolated from one another and are maintained in a safe and secure environment using firewalls. The firewalls can protect the system from malware and can be managed by support personnel in the production data center. The firewalls are configured to allow in bound traffic into the tools; but prevents the tools to initiate outbound communication. In embodiments, each of the isolated network subnets or segments can be accessed by the local server for that tool or the proxy server.

At step 305, the client is authenticated using, for example, LDAP. As discussed, the authentication prevents vendors (users) from accessing data in which they have no right to access. At step 310, the proxy server requests the IP address and or host name from the client. This enables the proxy server to locate the tools on the separate network subnets or segments. In embodiments, the tool engineer provides the IP address. The processes of steps 305 and 310, in embodiments, can be reversed.

At step 315, the proxy server initiates a TCP/IP handshake with the client to determine the software protocol and port information from the client. In embodiments, at step 320, the proxy server keeps the client application TCP/IP transport stream open. At step 325, the proxy server uses the protocol and port information and the IP address (or host name) to engage the tool with those ports and protocols.

At step 330, the proxy server queries the tool to see what ports the tool is listening on, and the proxy server mimics those exact ports. At step 335, the proxy server initiates and keeps the TCP/IP stream open and, at step 340, the proxy server then initiates the data transfer with the tool. As should be understood, the proxy server can check the transferred files for malware to protect the client. The proxy server can attempt to remediate any files with malware.

At step 345, the proxy server serves (provides) the data to the client. At step 350, the proxy server closes the TCP/IP stream that it opened with the tool. At step 355, the proxy server closes the TCP/IP stream with the client. At step 360, the proxy server logs the client off.

The method as described above is used in the fabrication of integrated circuit chips. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A system comprising a self-configuring server configured to create separate, isolated networks for a vendor specific toolset and query a client for connection information comprising client specific protocols and ports specified by the client for engaging an identified vendor specific toolset such that the self-configuring server can engage the identified vendor specific toolset on one of the separate isolated networks by mimicking the connection information comprising the client specific protocols and ports of the client.

2. The system of claim 1, wherein the self-configuring server is configured to create a firewall between the client and each of the separate, isolated networks.

3. The system of claim 2, wherein the firewall is configured to allow in bound traffic into the identified vendor specific toolset, while prohibiting initiation of outbound communications from the vendor specific toolset.

4. The system of claim 1, wherein the separate, isolated networks are subnets of a network.

5. The system of claim 1, wherein the self-configuring server is configured to:
    query the client for at least one of an IP address, host name and directory for connecting with the identified vendor specific toolset; and
    authenticate the client.

6. The system of claim 5, wherein the self-configuring server is configured to query the identified vendor specific toolset for a port that the identified vendor specific toolset is listening on, and to mimic the port exactly.

7. The system of claim 5, wherein the self-configuring server is configured to isolate vendor specific toolsets while engaging the identified vendor specific toolset, based on an authentication of the client and the connection information.

8. The system of claim 7, wherein the self-configuring server is configured to initiate a handshake with the client to determine the connection information including the client specific protocols and ports.

9. The system of claim 1, wherein the self-configuring server is configured to restrict remote communications with the vendor specific toolset other than through the self-configuring server.

10. The system of claim 1, wherein the self-configuring server is aware of all the separate, isolated networks and is configured to communicate natively with the vendor specific toolset residing on each of the separate, isolated networks.

11. The system of claim 1, wherein the self-configuring server is configured to remediate issues related to malware.

12. The system of claim 1, wherein the self-configuring server is configured to translate protocol and port information of the client to engage the vendor specific tools on each) of the separate, isolated networks.

13. A computer program product embodied in a computer usable storage medium for creating network subnets in a production facility for private, non-advertised tools, the computer program product including instructions for causing a computer to implement a method, comprising:
    creating isolated subnets based on vendor specific tool(s) in a private non-advertised network;
    obtaining authentication, client specific protocols and ports, and location information from a client to engage with a specific tool or group of tools residing on one of the isolating subnets, wherein the client specific protocols and ports are specified by the client for engaging the specific tool or group of tools; and
    providing communications between the client and the specific tool or group of tools in one of the isolated subnets based on at least the client specific protocols and ports specified by the client for engaging the specific tool or group of tools.

14. The computer program product of claim 13, further comprising protecting each of the isolated subnets from malware.

15. A method, comprising:
    creating isolated network subnets for each tool or toolsets associated with a vendor in a production network;
    querying a client for client specific protocols and ports, and location information of a tool or toolsets to engage therewith on the isolated network subnets, wherein the client specific protocols and ports are specified by the client for engaging the tool or toolsets;
    receiving the client specific protocols and ports and location information and engaging the tool or toolsets associated with the location information and conveying data from the engaged tool or toolsets to the client based on at least the client specific protocols and ports specified by the client for engaging the tool or toolsets.

16. The method of claim 15, further comprising authenticating the client prior to the conveying.

17. The method of claim 15, further comprising creating a firewall to protect the tool or toolsets from malware and/or unauthorized users.

18. The method of claim 15, further comprising determining a port which the engaged tool or toolsets is listening on and connecting to the port.

19. The method of claim 18, wherein the conveying of data from the engaged tool or toolsets to the client is further based on the port which the engaged tool or toolsets is listening on.

20. The method of claim 19, further comprising keeping a transport stream open after the determining of the port.

21. The method of claim 15, further comprising translating the unique protocols and ports to engage with the tool or toolsets.

22. The method of claim 15, further comprising remediating malware issues prior to the engaging of the tool or toolsets.

23. The method of claim 15, wherein the querying comprises initiating a handshake with the client to determine the client specific protocols and ports.

24. The method of claim 23, further comprising keeping a client application transport stream open after the querying.

* * * * *